United States Patent [19]

Takeuchi et al.

[11] Patent Number: 5,569,558

[45] Date of Patent: Oct. 29, 1996

[54] REDUCED VOLTAGE DELAY ADDITIVE FOR NONAQUEOUS ELECTROLYTE IN ALKALI METAL ELECTROCHEMICAL CELL

[75] Inventors: Esther S. Takeuchi, East Amherst; Karen M. Walsh, Marilla, both of N.Y.

[73] Assignee: Wilson Greatbatch Ltd., Clarence, N.Y.

[21] Appl. No.: 462,175

[22] Filed: Jun. 5, 1995

[51] Int. Cl.⁶ .................................................. H01M 6/00
[52] U.S. Cl. ........................ 429/122; 429/48; 429/192; 429/194; 429/207; 429/218; 429/49; 252/62.2; 252/500
[58] Field of Search ................ 429/48, 218, 122, 429/192, 194, 207; 252/62.2, 500

[56] References Cited

U.S. PATENT DOCUMENTS

| | | | |
|---|---|---|---|
| 3,976,509 | 8/1976 | Tsai et al. | 136/154 |
| 4,085,256 | 4/1978 | Dey | 429/48 |
| 4,277,545 | 7/1981 | Kalnoki-Kis | 429/194 |
| 4,326,014 | 4/1982 | Dey | 429/48 |
| 4,528,254 | 7/1985 | Wolf et al. | 429/194 |
| 4,853,304 | 8/1989 | Edner et al. | 429/192 |
| 5,130,211 | 7/1992 | Wilkinson et al. | 429/194 |

Primary Examiner—Bruce F. Bell
Attorney, Agent, or Firm—Hodgson, Russ, Andrews Woods & Goodyear LLP

[57] ABSTRACT

An improved alkali metal/mixed metal oxide electrochemical cell capable of delivering high current pulses, rapidly recovering its open circuit voltage and having high current capacity, is described. The stated benefits are realized by dissolving a carbon oxide such as $CO_2$ in the electrolyte.

36 Claims, 8 Drawing Sheets

REDUCED VOLTAGE DELAY ADDITIVE FOR NONAQUEOUS ELECTROLYTE IN ALKALI METAL ELECTROCHEMICAL CELL

BACKGROUND OF INVENTION

1. Field of the Invention

The present invention generally relates to an alkali metal electrochemical cell, and more particularly, to a lithium cell suitable for current pulse discharge applications with reduced or no appreciable voltage delay. Still more particularly, the present invention relates to an alkali metal electrochemical cell having an electrolyte provided with an additive for the purpose of reducing and/or eliminating voltage delay under current pulse discharge applications. The preferred additive is a carbon oxide such as carbon dioxide.

Voltage delay is a phenomenon typically exhibited in alkali metal/mixed metal oxide cells, and particularly, in lithium/silver vanadium oxide cells, when a cell of this chemistry has been depleted of 40% to 70% of its capacity and is subjected to current pulse discharge applications. The voltage response of a cell which does not exhibit voltage delay during the application of a short duration pulse or pulse train has distinct features. First, the cell potential decreases throughout the application of the pulse until it reaches a minimum at the end of the pulse, and second, the minimum potential of the first pulse in a series of pulses is higher than the minimum potential of the last pulse. FIG. 1 is a graph showing an illustrative discharge curve 10 as a typical or "ideal" response of a cell during the application of a series of pulses as a pulse train that does not exhibit voltage delay.

The voltage response of a cell which does exhibit voltage delay during the application of a short duration pulse or during a pulse train can take one or both of two forms. One form is that the leading edge potential of the first pulse is lower than the end edge potential of the first pulse. In other words, the voltage of the cell at the instant the first pulse is applied is lower than the voltage of the cell immediately before the first pulse is removed. The second form of voltage delay is that the minimum potential of the first pulse is lower than the minimum potential of the last pulse when a series of pulses have been applied. FIG. 2 is a graph showing an illustrative discharge curve 12 as the voltage response of a cell that exhibits both forms of voltage delay.

The initial drop in cell potential during the application of a short duration pulse reflects the resistance of the cell, i.e., the resistance due to the cathode, anode, electrolyte, surface films and polarization. In the absence of voltage delay, the resistance due to passivated films on the anode and/or cathode is negligible. However, the formation of a surface film is unavoidable for alkali metal, and in particular, lithium metal anodes, and for lithium intercalated carbon anodes, due to their low potential and high reactivity towards organic electrolytes. Thus, the ideal anode surface film should be electrically insulating and ionically conducting. While most alkali metal, and in particular, lithium electrochemical systems meet the first requirement, the second requirement is difficult to achieve. In the event of voltage delay, the resistance of these films is not negligible, and as a result, impedance builds up inside the cell due to this surface layer formation which often results in reduced discharge voltage and reduced cell capacity. In other words, the drop in potential between the background voltage and the lowest voltage under pulse discharge conditions, excluding voltage delay, is an indication of the conductivity of the cell, i.e., the conductivity of the cathode, anode, electrolyte, and surface films, while the gradual decrease in cell potential during the application of the pulse train is due to the polarization of the electrodes and electrolyte.

Thus, the existence of voltage delay is an undesirable characteristic of alkali metal/mixed metal oxide cells subjected to current pulse discharge conditions in terms of its influence on devices such as medical devices including implantable pacemakers and cardiac defibrillators. Voltage delay is undesirable because it limits the effectiveness and even the proper functioning of both the cell and the associated electrically powered device under current pulse discharge conditions.

2. Description of the Prior Art

The provision of an additive in the electrolyte of an electrochemical system is shown in U.S. Pat. No. 4,853,304 to Ebner et al. which relates to improvements with respect to the recharging of secondary active metal cells. Such cells include those having anodes of lithium activated with a nonaqueous electrolyte solution which utilizes an organic ester of methyl formate together with lithium salt and an additive of $CO_2$ in the electrolyte solution. The addition of the $CO_2$ results in high lithium cycling efficiencies in this secondary electrochemical cell, and sufficient cell conductivity so that the high energy density of the cell can be maintained over a broad temperature interval and over a wide range of discharge rates. This patent discloses that the $CO_2$ electrolyte also appears to reduce passivation effects in methyl formate solutions.

The present invention is directed to a lithium/mixed metal oxide cell system that is preferably activated with a electrolyte comprising solvents from a family of cyclic carbonates and diethers having an inorganic salt with the general formula $MM'F_6$ dissolved therein. This electrolyte solution is chemically dissimilar to the electrolyte solution disclosed by Ebner et al.

U.S. Pat. Nos. 4,085,256 and 4,326,014 to Dey relate to the inhibition of self-discharge of high temperature organic electrolyte cells. The active anode material preferably consists of lithium and it is pre-treated in a solution of the electrolyte through which is bubbled, in a gaseous form, certain reactants including $CO_2$ to form a coating layer upon the anode. The coating layer is insoluble in the electrolyte during open circuit storage and does not appear to interfere with the onset of the discharge reaction or with the total capacity of the cell. This patent does not discuss the use of carbon dioxide as an electrolyte additive for the purpose of reducing and/or eliminating voltage delay.

SUMMARY OF THE INVENTION

The present invention is directed to improvements in the pulse discharge performance of an alkali metal/mixed metal oxide electrochemical cell by dissolving a carbon oxide such as carbon dioxide in the nonaqueous electrolyte solution. The thusly fabricated cell exhibits reduced or no appreciable voltage delay under current pulse discharge usage, which is an unexpected result. More particularly, the present invention is directed to the introduction of carbon dioxide into the electrolyte of a lithium/silver vanadium oxide electrochemical cell for the purpose of reducing and/or eliminating voltage delay. This electrochemical system is activated with an electrolyte comprising solvents from a family of cyclic carbonates and diethers. The solute of the electrolyte is an inorganic salt having the general formula MM'F6. Dissolved carbon dioxide is introduced into the electrolyte as an additive to interact with the alkali metal anode, and particularly with the lithium anode, to form an ionically conductive protective anode surface layer which improves the discharge performance of the cell, and minimizes or even eliminates voltage delay in current pulse discharge conditions.

DETAILED DESCRIPTION OF THE PREFERRED EMBODIMENTS

Figure 1:
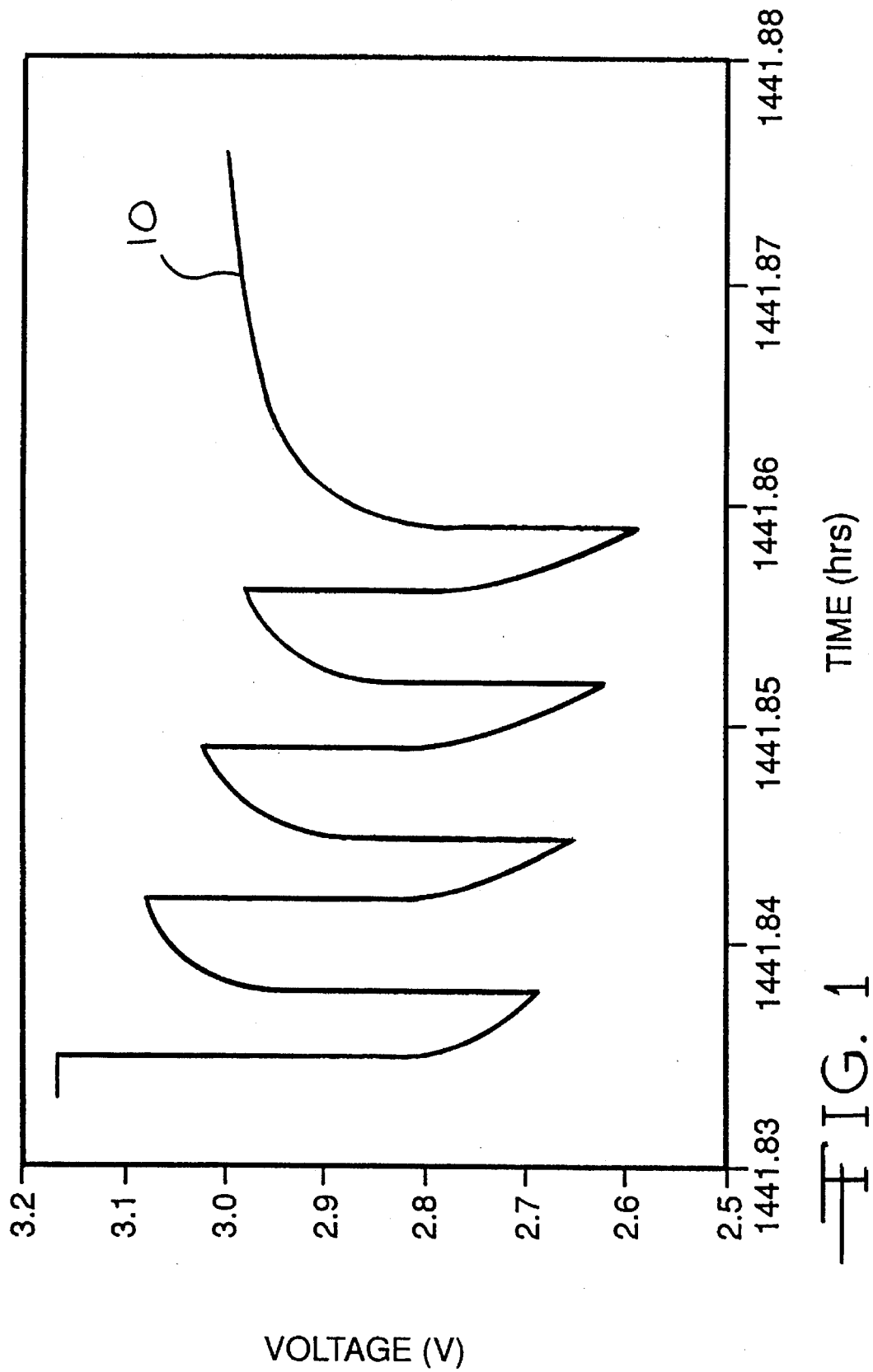
FIG. 1 is a graph showing an illustrative pulse discharge curve 10 of an exemplary electrochemical cell that does not exhibit voltage delay.

The electrochemical cell according to the present invention includes an anode electrode selected from Group IA of the Periodic Table of Elements, including lithium, sodium, potassium, etc., and their alloys and intermetallic compounds including, for example Li-Si, Li-B and Li-Si-B alloys and intermetallic compounds. The preferred anode comprises lithium, and the more preferred anode comprises a lithium alloy, the preferred lithium alloy being lithium-aluminum with the aluminum comprising from between about 0% to about 50% by weight of the alloy. The greater the amount of aluminum present by weight in the alloy the lower the energy density of the cell.

The form of the anode may vary, but preferably the anode is a thin metal sheet or foil of the anode metal, pressed or rolled on a metallic anode current collector, i.e., preferably comprising nickel, to form an anode component. In the exemplary cell of the present invention, the anode component has an extended tab or lead of the same material as the anode current collector, i.e., preferably nickel, integrally formed therewith, such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The cathode electrode may comprise a metal element, a metal oxide, a mixed metal oxide, a metal sulfide or carbonaceous compounds, and combinations thereof. Suitable cathode materials include silver vanadium oxide, copper vanadium oxide, copper silver vanadium oxide, manganese dioxide, titanium disulfide, copper oxide, copper sulfide, iron sulfide, iron disulfide, carbon and fluorinated carbon. The solid cathode exhibits excellent thermal stability and is generally safer and less reactive than a non-solid cathode.

Preferably, the cathode material comprises a mixed metal oxide formed by chemical addition, reaction or otherwise intimate contact or by a thermal spray coating process of various metal sulfides, metal oxides or metal oxide/elemental metal combinations. The materials thereby produced contain metals and oxides of Groups IB, IIB, IIIB, IVB, VB, VIB, VIIB and VIII of the Periodic Table of Elements, which includes the noble metals and/or their oxide compounds.

By way of illustration, and in no way intended to be limiting, an exemplary cathode active material comprises silver vanadium oxide having the general formula $Ag_xV_2O_y$, in any one of its many phases, i.e. β-phase silver vanadium oxide having in the general formula x=0.35 and y=5.18, γ-phase silver vanadium oxide having in the general formula x=0.74 and y=5.37 and ε-phase silver vanadium oxide having in the general formula x=1.0 and y=5.5, and combination and mixtures of phases thereof.

Such cathode active materials may be pressed into a cathode pellet with the aid of a suitable binder material such as a fluoro-resin powder, preferably polytetrafluoroethylene (PTFE) powder, and a material having electronic conductive characteristics such as graphite powder, acetylene black powder and carbon black powder. In some cases, no binder material or electronic conductor material is required to provide a similarly suitable cathode body. In some cases, the cathode active materials may also be prepared by rolling, spreading or pressing a mixture of the materials mentioned above onto a suitable current collector. Cathodes prepared as described above may be in the form of one or more plates operatively associated with at least one or more plates of anode material, or the cathode may be in the form of a strip wound with a corresponding strip of anode material in a structure similar to a "jellyroll".

The cell of the present invention includes a separator to provide physical separation between the anode and cathode active electrodes. The separator is of electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include non-woven glass, polypropylene, polyethylene, glass fiber material, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.)

The form of the separator typically is a sheet which is placed between the anode and cathode electrodes and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The electrochemical cell of the present invention further includes a nonaqueous, ionically conductive electrolyte which serves as a medium for migration of ions between the anode and the cathode during the electrochemical reactions of the cell. The electrochemical reaction at the cathode involves conversion of ions which migrate from the anode to the cathode in atomic or molecular forms. Nonaqueous electrolytes suitable for the present invention are substantially inert to the anode and cathode materials, and they exhibit those physical properties necessary for ionic transport namely, low viscosity, low surface tension and wettability.

A suitable electrolyte has an inorganic, ionically conductive salt dissolved in a nonaqueous solvent, and more preferably, the electrolyte includes an alkali metal salt dissolved in a mixture of aprotic organic solvents comprising a low viscosity solvent and a high permittivity solvent. The inorganic, ionically conductive salt has the general formula MM'F$_6$ wherein M is an alkali metal similar to the alkali metal comprising the anode and M' is an element selected from the group consisting of phosphorous, arsenic and antimony. Examples of salts yielding M'F$_6$ are: hexafluorophosphate (PF$_6$), hexafluoroarsenate (AsF$_6$) and hexafluoroantimonate (SbF$_6$). Alternatively, the corresponding sodium or potassium salts may be used.

Preferably the electrolyte comprises at least one ion-forming alkali metal salt of hexafluorophosphate, hexafluoroarsenate or hexafluoroantimonate dissolved in a suitable organic solvent wherein the ion-forming alkali metal is similar to the alkali metal comprising the anode. Thus, in the case of an anode comprising lithium, the alkali metal salt comprises lithium hexafluorophosphate, lithium hexafluoroarsenate or lithium hexafluoroantimonate dissolved in a suitable solvent mixture. Other salts useful with the present invention include LiBF$_4$, LiClO$_4$, LiC(SO$_2$CF$_3$)$_3$, LiN(SO$_2$CF$_3$)$_2$ and LiCF$_3$SO$_3$, and mixture thereof.

Low viscosity solvents are preferably selected from an ester, an ether or a dialkyl carbonate. Suitable compounds include tetrahydrofuran (THF), methyl acetate (MA), diglyme, triglyme, tetraglyme, dimethyl carbonate (DMC), 1,2-dimethoxyethane (DME) and mixtures thereof. The high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-butyrolactone (GBL) and N-methyl-pyrrolidinone (NMP) and mixtures thereof. In the present invention, the anode is lithium metal and the preferred electrolyte is 1.0M to 1.4M LiAsF$_6$ dissolved in an aprotic solvent mixture comprising a 50/50 mixture (by volume) of propylene carbonate (PC) and dimethoxyethane (DME).

In accordance with the present invention a carbon oxide such as carbon dioxide (CO$_2$) is dissolved in the electrolyte solution for the purpose of reducing and/or eliminating voltage delay. Other carbon oxides include dicarbon dioxide, tricarbon dioxide, tetracarbon dioxide, pentacarbon dioxide and the like. In the case of carbon dioxide, the solution is provided with between about 0.01% to about 1.0%, by weight, of the additive. For concentrations of carbon dioxide approaching the upper limit of this range, modifications to the electrochemical system may be required such as pressurizing the system or lowering the temperature of the electrolyte before the voltage delay reducing additive is dissolved therein and the thusly modified electrolyte is introduced in the cell casing.

Although the mechanism is not well understood at this time, it is believed that the carbon oxide present in the electrolyte acts as a precursor to form an ionically conductive, protective film on the surface of the anode, which results in the resistance of this film being negligible. In the case of carbon dioxide, the alkali metal anode reacts with this additive to form an alkali carbonate layer such as a lithium carbonate layer that mediates reaction between the anode and the electrolyte and which promotes ion transfer. As a result, little if any impedance build up occurs inside the cell due to this surface layer formation which beneficially results in reduced or no appreciable voltage delay. Furthermore this film or passivation layer is stable, and as the cell is discharged the film or layer may reform due to the presence of CO$_2$ gas in the electrolyte.

The assembly of the cell described herein is preferably in the form of a wound element cell. That is, the fabricated cathode, anode and separator are wound together in a "jellyroll" type configuration or "wound element cell stack" such that the anode is on the outside of the roll to make electrical contact with the cell case in a case-negative configuration. Using top and bottom insulators, the wound cell stack is inserted into a metallic case of a suitable size dimension. The metallic case may comprise materials such as stainless steel, mild steel, nickel-plated mild steel, titanium or aluminum, but not limited thereto, so long as the metallic material is compatible for use with components of the cell.

The cell header comprises a metallic disc-shaped or rectangular-shaped body with a first hole to accommodate a glass-to-metal seal/terminal pin feedthrough and a second hole for electrolyte filling. The glass used is of a corrosion resistant type having from between about 0% to about 50% by weight silicon such as CABAL 12, TA 23FUSITE 425 or FUSITE 435. The positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte solution described hereinabove and hermetically sealed such as by close-welding a stainless steel disc or ball over the fill hole, but not limited thereto. This above assembly describes a case-negative cell which is the preferred construction of the exemplary cell of the present invention. As is well known to those skilled in the art, the exemplary electrochemical system of the present invention can also be constructed in a case-positive configuration.

The following examples describe the manner and process of an electrochemical cell according to the present invention, and set forth the best mode contemplated by the inventors of carrying out the invention, but are not to be construed as limiting.

EXAMPLE I

Tests cells were constructed having a lithium anode and an electronically conductive cathode comprising silver vanadium oxide, along with an organic electrolyte. The cell design utilized a cathode in the form of a sheet consisting of a mixture of 94% of SVO cathode active material, by weight, along with 3% of a fluoro-resin powder, 2% graphite, and 1% carbon black. The mixture was pressed onto an expanded metal current collector, and encapsulated in a polypropylene separator. The anode of each cell was a strip of metallic lithium pressed onto a nickel current collector and also encapsulated in a polypropylene separator. The polypropylene separator for both the anode and the cathode was a 0.0035" film laminate. The anode was wrapped accordion style around the cathode plates to provide an active electrode surface area of 81.4 sq. cm. The cells were filled with a 1 molar solution of lithium hexafluoroarsenate (LiAsF$_6$) dissolved in an equal volume mixture of propylene carbonate (PC) and 1,2-dimethoxyethane (DME) as the electrolyte. The cells were hermetically sealed.

Twenty cells were constructed as described above. Ten cells were activated having the electrolyte solution containing about 0.2% by weight, CO$_2$ according to the present invention, and ten cells were activated with the electrolyte devoid of any CO$_2$ dissolved therein. The CO$_2$ is added to the electrolyte before it is introduced to the enclosure. A constant resistive load of 3.57 kΩ was applied to all the cells for 21 hours during an initial predischarge period. The predischarge period is referred to as burn-in and depleted the cells of ~1% of their theoretical capacity. Following burn-in, the cells were subjected to acceptance pulse testing consisting of four 10 second 1.5 Amp pulses with 15 second rests between each pulse.

Table 1 shows the average (±1 standard deviation) preload, first load, last load and postload burn-in voltages (mV) and the average (±1 standard deviation) pulse 1 minimum (P1 Min.), final pulse 1 (P1 End), pulse 4 minimum (P4 Min.), final pulse 1 minus pulse 1 minimum (P1 End–P1 Min.), and prepulse open circuit voltage (OCV) minus pulse 1 minimum (Pre P1–P1 Min.) acceptance pulse voltages (mV). P1 End-P1 Min. is a mathematical representation of the magnitude of voltage delay and it is zero in the absence of this phenomenon.

The cells of the conventional technology had slightly higher preload, first load and last load burn-in voltages and slightly lower postload burn-in voltages than the cells of the present invention. The conventional cells also had higher acceptance pulse voltages and exhibited less voltage delay under acceptance pulse testing than the cells of the present invention.

TABLE 1

| Electrolyte Type | S.N. | Burn-In Data | | | | Acceptance Pulse Data | | | | |
|---|---|---|---|---|---|---|---|---|---|---|
| | | Pre Load | First Load | Last Load | Post Load | P1 Min. | P1 End | P4 Min. | P1 End–P1 Min. | Pre P1–P1 Min. |
| w/out CO$_2$ | 76993 | 3469 | 3467 | 3196 | 3271 | 2402 | 2705 | 2673 | 303 | 869 |
| w/out CO$_2$ | 76994 | 3473 | 3471 | 3197 | 3271 | 2373 | 2695 | 2666 | 322 | 898 |
| w/out CO$_2$ | 76995 | 3474 | 3472 | 3197 | 3271 | 2363 | 2693 | 2664 | 330 | 908 |
| w/out CO$_2$ | 76996 | 3467 | 3465 | 3197 | 3270 | 2378 | 2703 | 2671 | 325 | 893 |
| w/out CO$_2$ | 76997 | 3465 | 3463 | 3197 | 3271 | 2412 | 2705 | 2671 | 293 | 859 |
| w/out CO$_2$ | 76998 | 3469 | 3467 | 3197 | 3270 | 2410 | 2705 | 2676 | 295 | 861 |
| w/out CO$_2$ | 76999 | 3472 | 3470 | 3197 | 3270 | 2385 | 2695 | 2668 | 310 | 886 |
| w/out CO$_2$ | 77000 | 3484 | 3482 | 3198 | 3271 | 2402 | 2703 | 2673 | 301 | 869 |
| w/out CO$_2$ | 77001 | 3468 | 3466 | 3197 | 3270 | 2393 | 2700 | 2673 | 307 | 876 |
| w/out CO$_2$ | 77002 | 3464 | 3462 | 3198 | 3271 | 2471 | 2725 | 2688 | 254 | 800 |
| Average: | | 3471 | 3469 | 3197 | 3271 | 2399 | 2703 | 2672 | 304 | 872 |
| Std Dev (± sigma): | | 6 | 6 | 1 | 1 | 30 | 9 | 7 | 22 | 30 |
| w/CO$_2$ | 77003 | 3477 | 3474 | 3198 | 3274 | 2153 | 2703 | 2676 | 550 | 1121 |
| w/CO$_2$ | 77004 | 3480 | 3477 | 3198 | 3274 | 2126 | 2703 | 2668 | 577 | 1148 |
| w/CO$_2$ | 77005 | 3455 | 3453 | 3195 | 3274 | 2109 | 2681 | 2668 | 572 | 1165 |
| w/CO$_2$ | 77007 | 3442 | 3440 | 3195 | 3273 | 2043 | 2654 | 2659 | 611 | 1231 |
| w/CO$_2$ | 77008 | 3448 | 3445 | 3195 | 3274 | 2004 | 2649 | 2651 | 645 | 1270 |
| w/CO$_2$ | 77009 | 3455 | 3452 | 3196 | 3273 | 2195 | 2656 | 2656 | 461 | 1076 |
| w/CO$_2$ | 77010 | 3459 | 3457 | 3196 | 3273 | 2112 | 2681 | 2668 | 569 | 1162 |
| w/CO$_2$ | 77011 | 3442 | 3440 | 3195 | 3273 | 2048 | 2659 | 2659 | 611 | 1226 |
| w/CO$_2$ | 77012 | 3453 | 3451 | 3196 | 3273 | 2056 | 2656 | 2659 | 600 | 1218 |
| Average: | | 3457 | 3454 | 3196 | 3273 | 2094 | 2671 | 2663 | 577 | 1180 |
| Std Dev (± sigma): | | 14 | 13 | 1 | 1 | 61 | 21 | 8 | 52 | 61 |

EXAMPLE II

Figure 3:
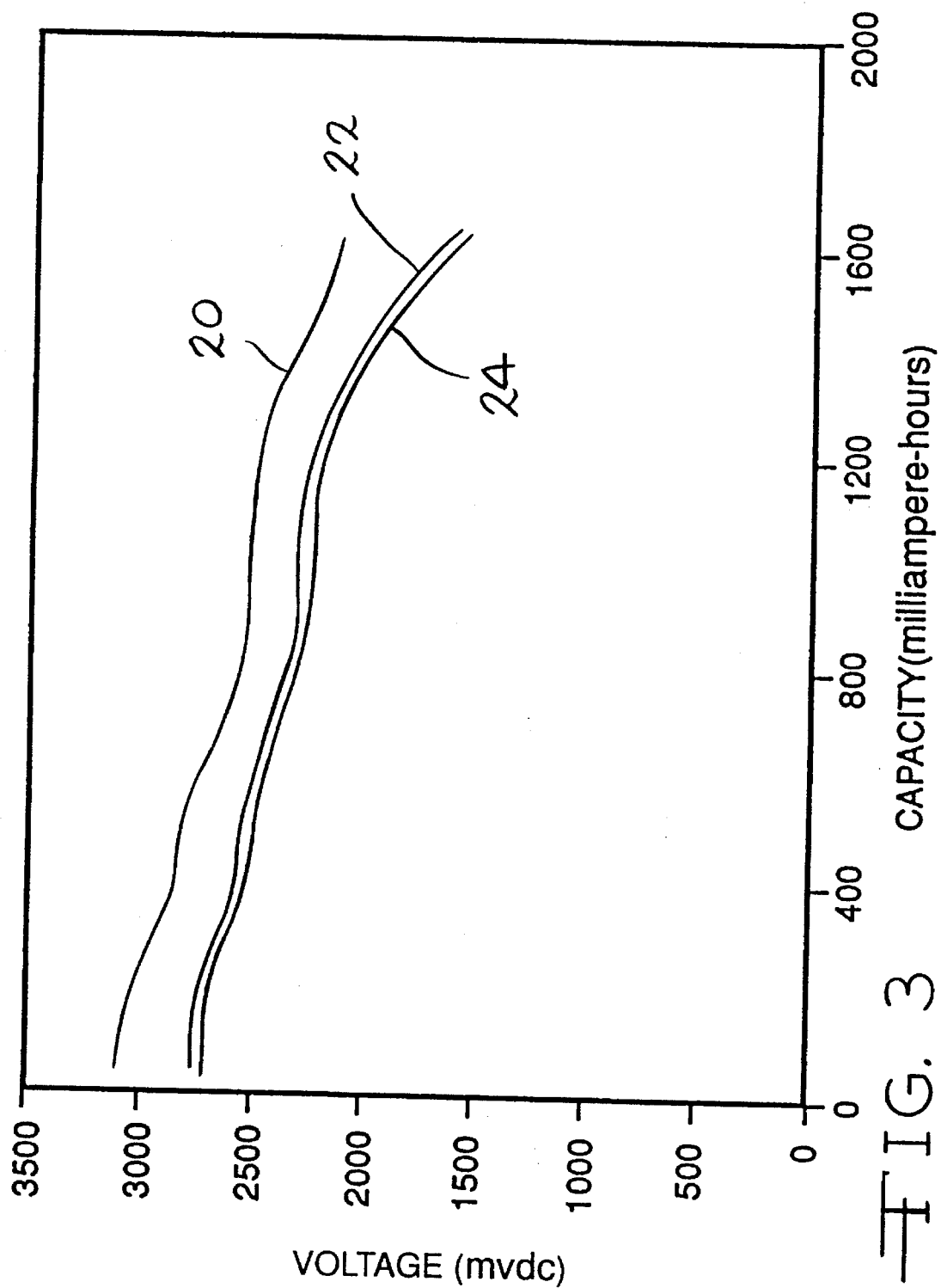
FIG. 3 is a graph showing the voltages under prepulse load, P1 Min. and P4 Min. versus delivered capacity of a lithium/silver vanadium oxide cell activated with an electrolyte devoid of dissolved carbon dioxide.
Figure 4:
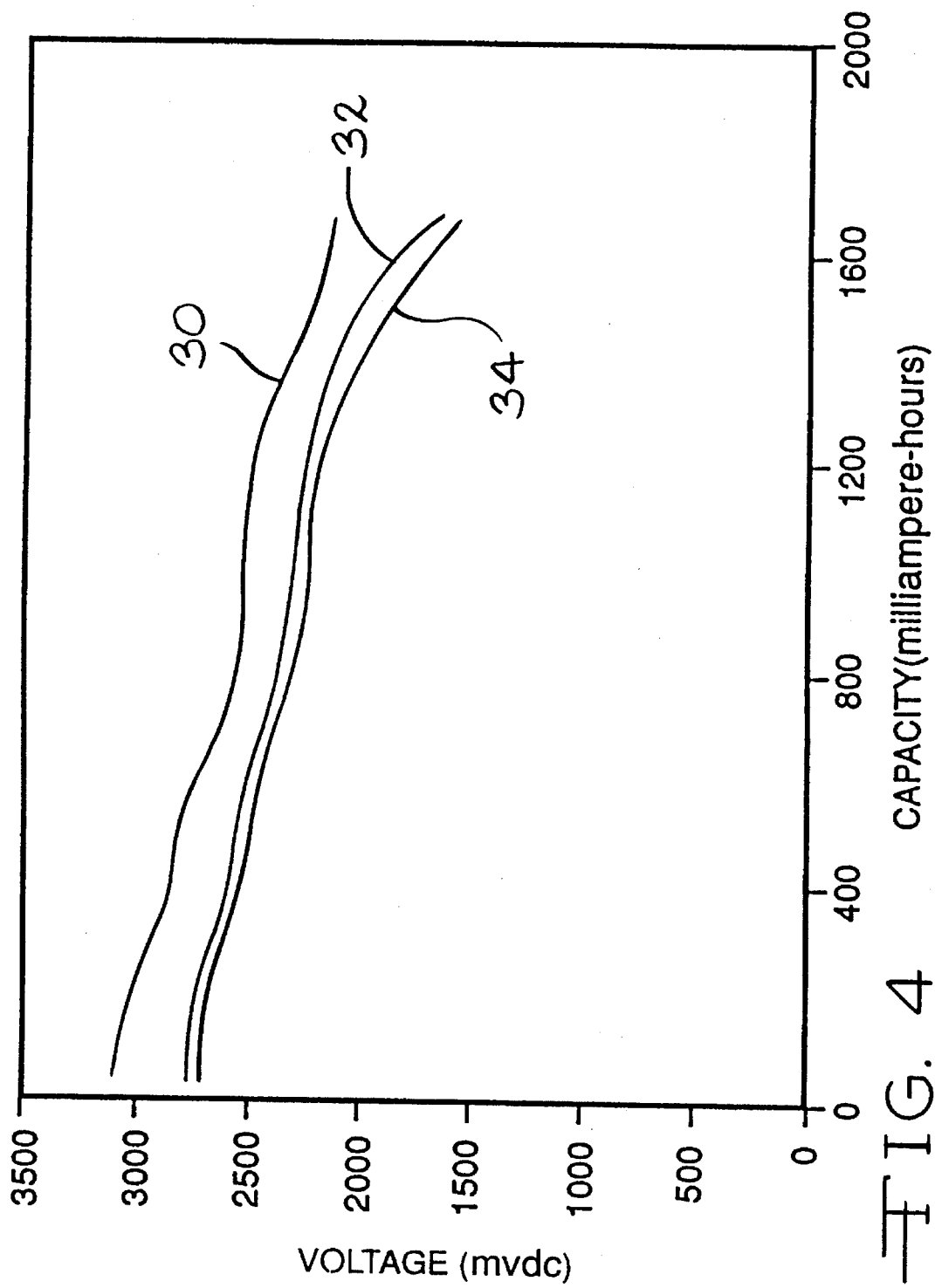
FIG. 4 is a graph showing the voltages under prepulse load, P1 Min. and P4 Min. versus delivered capacity of a lithium/silver vanadium oxide cell activated with an electrolyte having carbon dioxide dissolved therein.

Half of the prior art cells and half of the present invention cells were accelerated pulse discharged to 1.5 V by the application of a pulse train every thirty minutes consisting of four 10 second 1.5 Amp pulses with 15 seconds rest between each pulse. Table 2 shows the amount of capacity (mAhrs) delivered under this pulse regime to 2.0 V, 1.7 V and 1.5 V and the number of pulse trains applied to each cell tested. In addition, Table 2 shows the average (±1 standard deviation) of each data point for each group, i.e., the prior art cells (without CO$_2$) and the present invention cells (with CO$_2$). FIG. 3 is a graph showing the discharge of a prior art cell indicated as serial no. 76994 wherein curve 20 was constructed from the prepulse voltage and curves 22 and 24 were constructed from the P1 Min. and P4 Min. discharge voltages versus delivered capacity, respectively. On the other hand, FIG. 4 is a graph showing the discharge of a cell constructed according to the present invention and indicated as serial no. 77005, wherein curve 30 was constructed from the prepulse voltage and curves 32 and 34 were constructed from the P1 Min. and P4 Min. discharge voltages versus delivered capacity, respectively.

TABLE 2

| Electrolyte Type | S.N. | mAhrs to 2.0 V | mAhrs to 1.7 V | mAhrs to 1.5 V | Pulse Trains Delivered |
|---|---|---|---|---|---|
| w/out CO$_2$ | 76993 | 1390 | 1563 | 1623 | 98 |
| w/out CO$_2$ | 76994 | 1384 | 1555 | 1614 | 97 |
| w/out CO$_2$ | 76995 | 1389 | 1554 | 1614 | 97 |
| w/out CO$_2$ | 76996 | 1400 | 1570 | 1629 | 98 |
| w/out CO$_2$ | 76997 | 1386 | 1552 | 1610 | 97 |

TABLE 2-continued

| | | | | | |
|---|---|---|---|---|---|
| Average: | | 1390 | 1559 | 1618 | 97 |
| Std. Dev (±1 sigma): | | 6 | 8 | 8 | 1 |
| w/CO$_2$ | 77003 | 1413 | 1586 | 1637 | 99 |
| w/CO$_2$ | 77005 | 1418 | 1593 | 1651 | 100 |
| w/CO$_2$ | 77007 | 1424 | 1608 | 1662 | 100 |
| w/CO$_2$ | 77009 | 1415 | 1587 | 1638 | 99 |
| w/CO$_2$ | 77011 | 1404 | 1595 | 1657 | 100 |
| Average: | | 1415 | 1594 | 1649 | 100 |
| Std Dev (±1 sigma): | | 7 | 9 | 11 | 1 |

The cells embodying the present invention delivered statistically more capacity to each voltage cut-off than the prior art cells during the accelerated pulse discharge regime. An average of 3 more pulse trains were applied to the present invention cells. Thus, it has been shown that the electrolyte additive does not adversely affect cell performance under accelerated test conditions.

EXAMPLE III

The remaining half of the cells were voltage delay tested. It is this testing which demonstrates the unexpected and realized advantage of the present invention. The voltage delay test regime consisted of discharging the cells under a 2000Ω load at 37° C. for 70 hours then storing at open circuit (OC) for 14 days at 50° C., cooling to 37° C. and applying a 1.5 Amp pulse train. The process was repeated with the following exceptions: the cells were discharged under a 200Ω load at 37° C. for 20 hours and stored at OC for 19 days at 50° C. The pulse trains were applied to the cells after approximately 50% and 65% of their capacity was depleted. In that respect, it should be noted that an alkali metal/mixed metal oxide cell chemistry, having been depleted of 40% to 70% of its capacity and without carbon dioxide dissolved in the activating electrolyte, typically exhibits voltage delay under current pulse discharge conditions.

Figure 2:
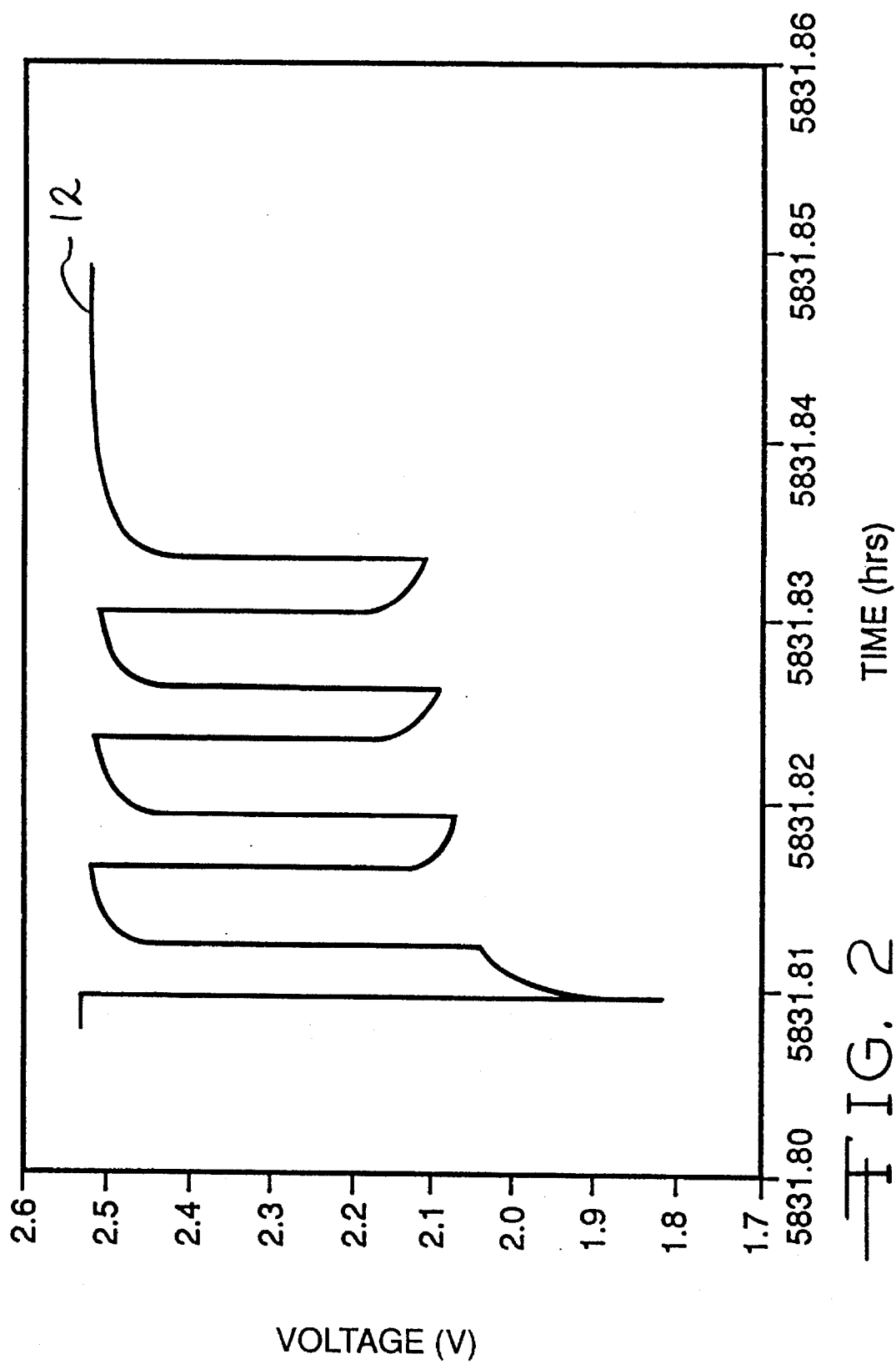
FIG. 2 is a graph showing an illustrative pulse discharge curve 12 of an exemplary electrochemical cell that exhibits voltage delay.
Figure 5:
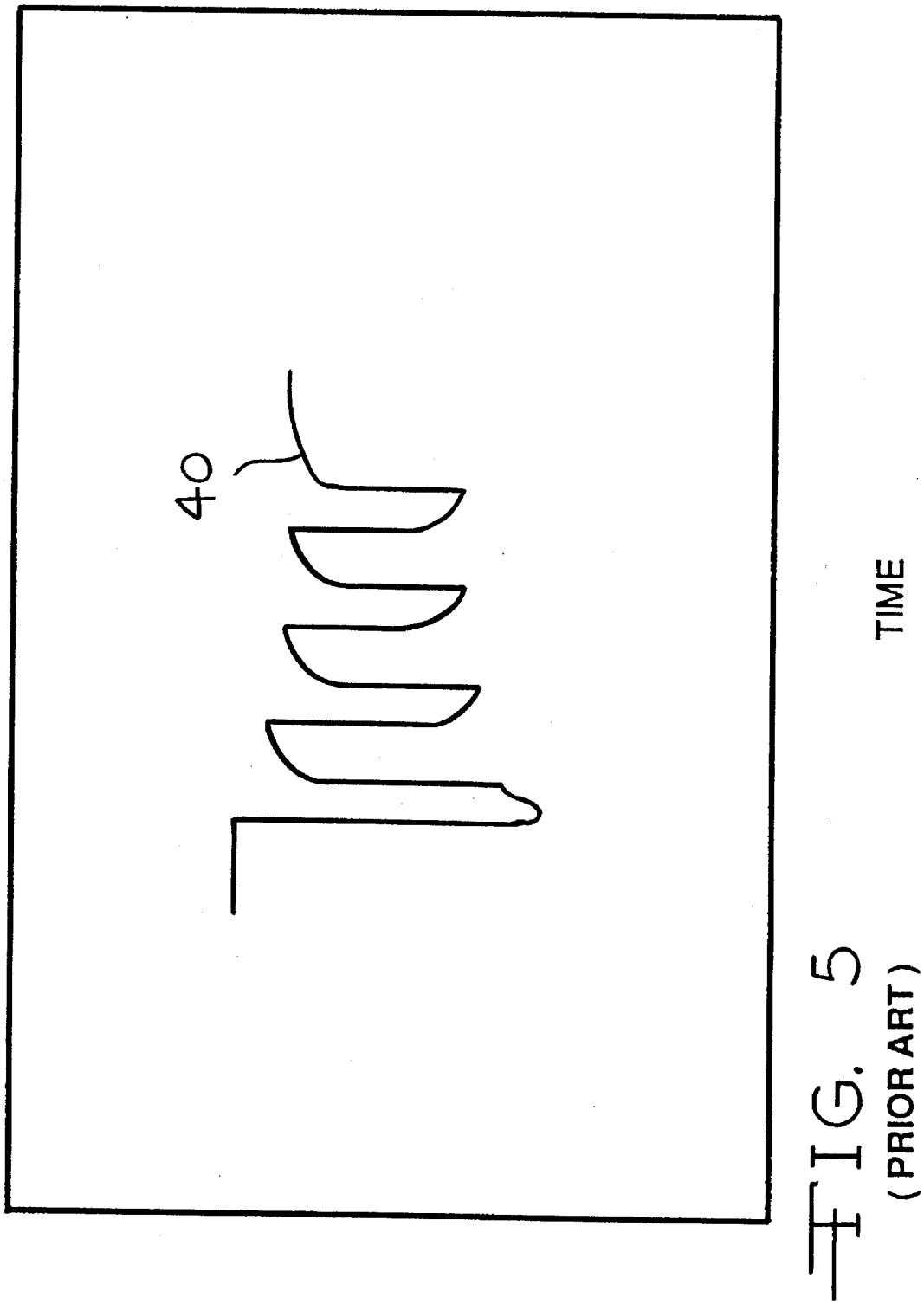
FIGS. 5 and 6 are graphs showing the discharge pulse voltage curves of a lithium/silver vanadium oxide cell activated with an electrolyte devoid of dissolved carbon dioxide during the application of the first and second pulse trains, respectively, of a voltage delay test.
Figure 6:
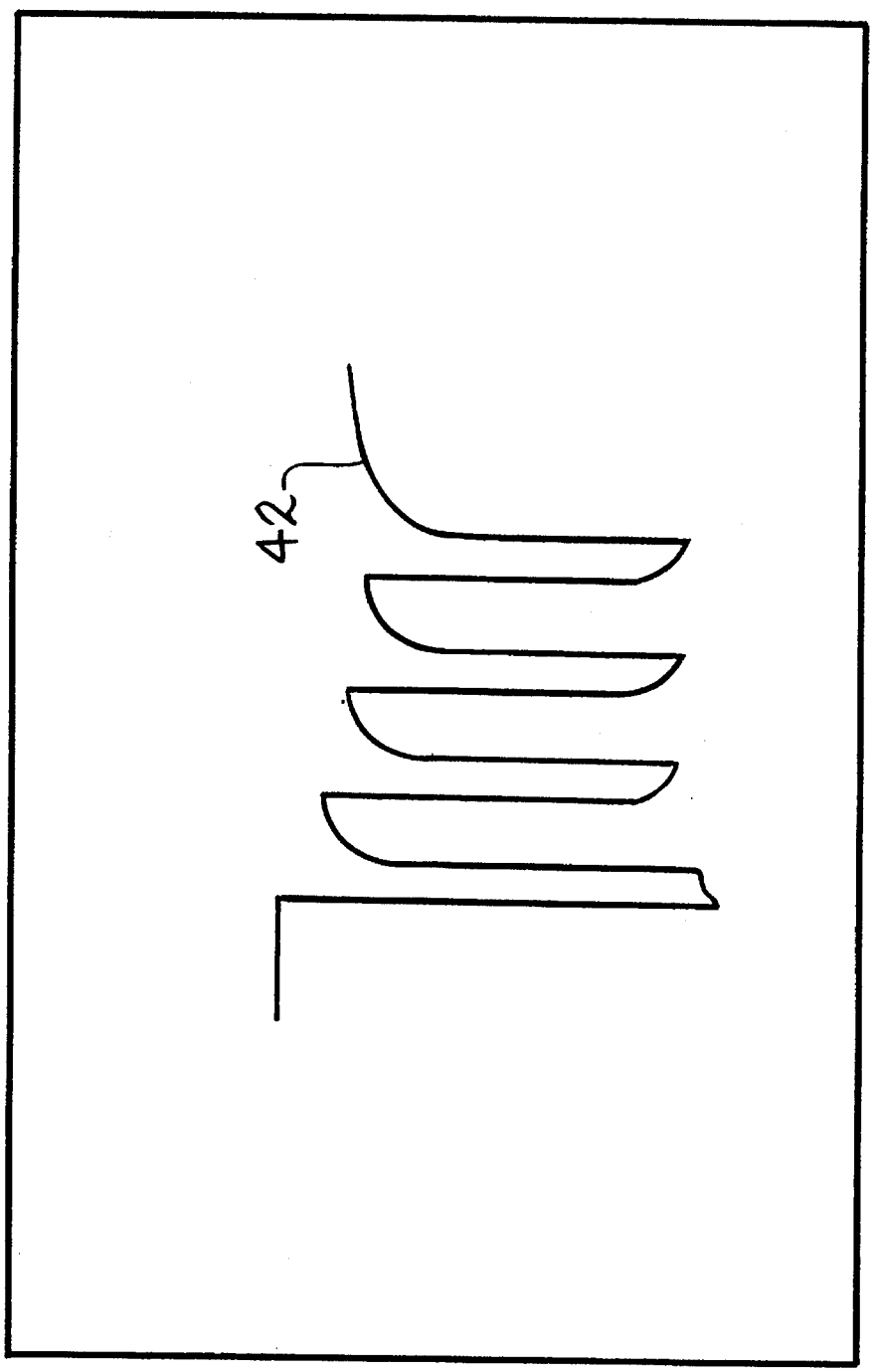
Figure 7:
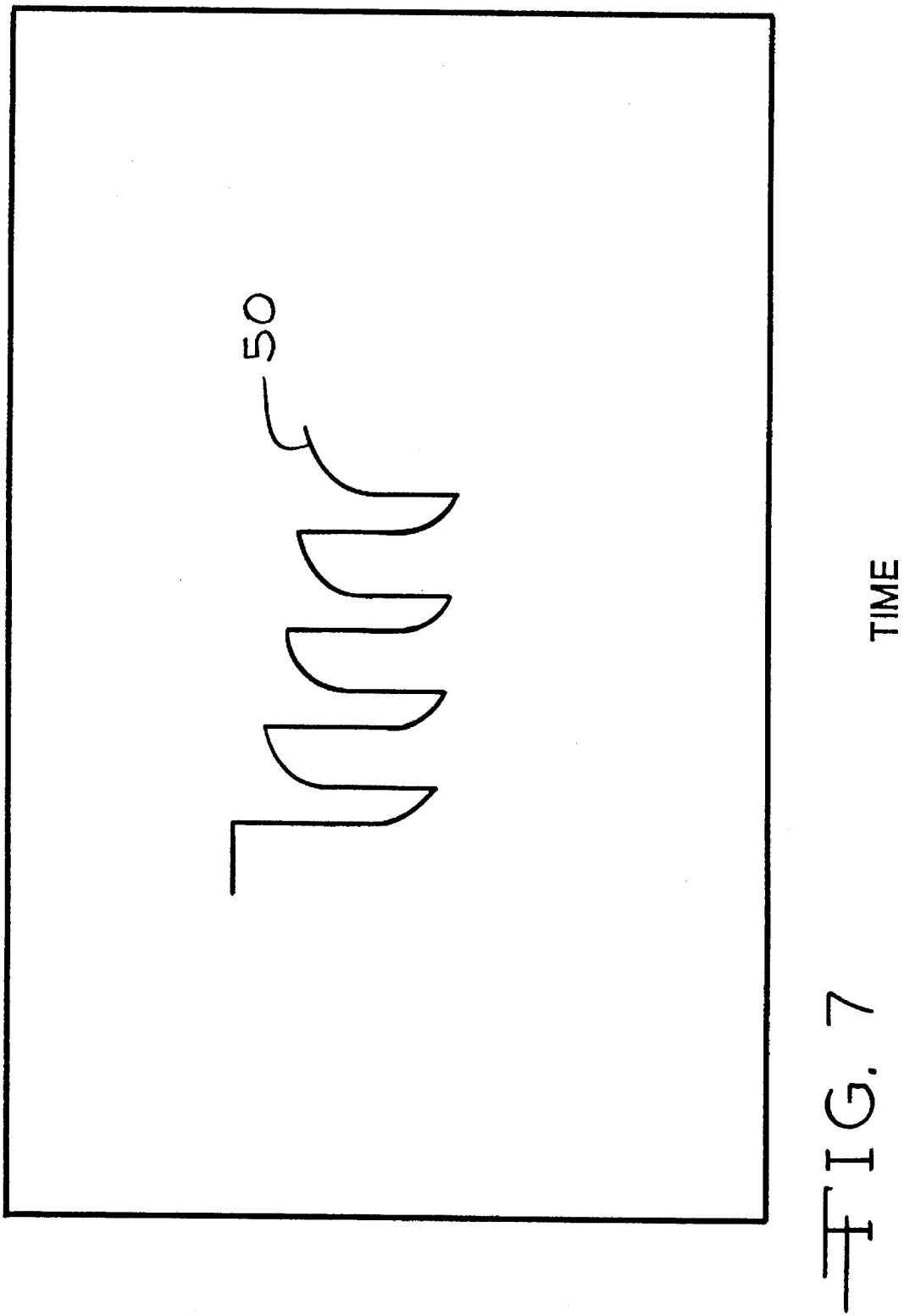
FIGS. 7 and 8 are graphs showing the pulse discharge curves of a lithium/silver vanadium oxide cell activated with an electrolyte having carbon dioxide dissolved therein during the application of the first and second pulse trains, respectively, of a voltage delay test.
Figure 8:
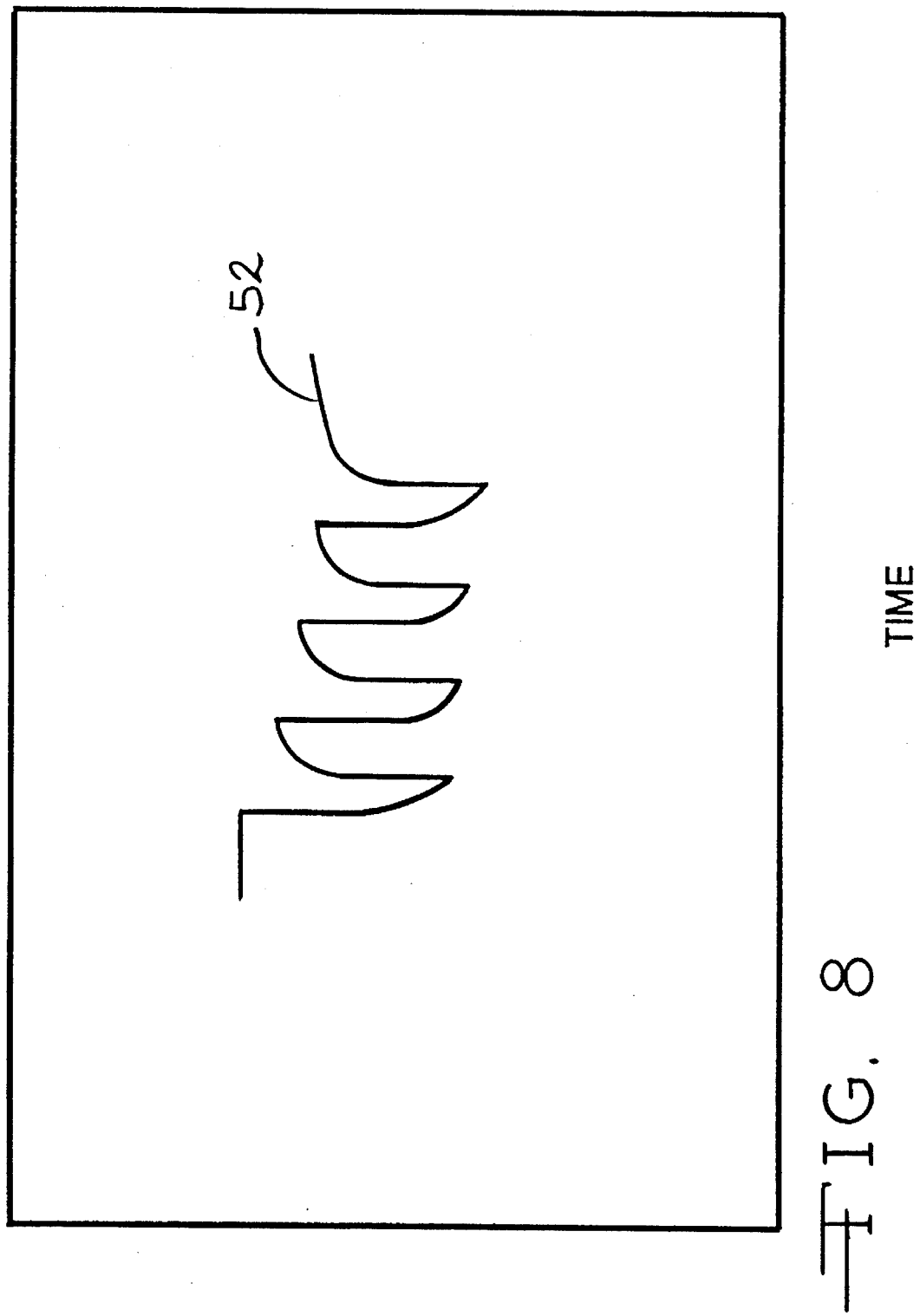

Voltage delay test results are presented in Table 3. The prepulse OCV, P1 Min., P1 End, P4 Min. and P1 End-P1 Min. pulse train voltages (mV) of both pulse trains are shown for each cell in this table. The cells embodying the present invention had higher pulse voltages, or in other words higher overall conductivity, than the cells of the conventional technology. The most dramatic improvement shown by the present invention cells, however, is in terms of voltage delay. The cells with the CO$_2$ saturated electrolyte did not exhibit any voltage delay while the current technology cells, i.e., those cells with their electrolyte devoid of carbon dioxide, had average voltage delay of 72 mV and 27 mV calculated as P1 End-P1 Min. for the first and second pulse train, respectively. FIGS. 5 and 6 are graphs showing the pulse trains of a prior art cell indicated as serial no. 76999 wherein curves 40 and 42 were constructed from the first and second pulse trains, respectively. The response of this prior art cell to each of the pulse trains is equivalent to the response of the cell depicted in FIG. 2, which exhibited both forms of voltage delay. FIGS. 7 and 8 are graphs showing the pulse trains of a cell constructed according to the present invention and indicated as serial no. 77012 wherein curves 50 and 52 were constructed from the first and second pulse trains, respectively. The response of the present invention cell to each of the pulse trains is equivalent to the response of the cell depicted in FIG. 1, which did not exhibit any voltage delay characteristics.

TABLE 3

| Electrolyte Type | S.N. | OCV | P1 Min. | P1 End | P4 Min. | P1 End-P1 Min. | OCV | P1 Min. | P1 End | P4 Min. | P1 End-P1 Min. |
|---|---|---|---|---|---|---|---|---|---|---|---|
| w/out CO$_2$ | 76998 | 2602 | 2100 | 2170 | 2240 | 70 | 2539 | 1900 | 1920 | 1950 | 20 |
| w/out CO$_2$ | 76999 | 2604 | 2100 | 2165 | 2230 | 65 | 2545 | 1900 | 1930 | 1910 | 30 |
| w/out CO$_2$ | 77000 | 2604 | 2100 | 2165 | 2230 | 65 | 2546 | 1890 | 1930 | 1950 | 40 |
| w/out CO$_2$ | 77001 | 2603 | 2100 | 2180 | 2240 | 80 | 2544 | 1875 | 1920 | 1950 | 45 |
| w/out CO$_2$ | 77002 | 2604 | 2090 | 2170 | 2230 | 80 | 2545 | 1940 | 1940 | 1955 | 0 |
| Average: | | 2603 | 2098 | 2170 | 2234 | 72 | 2544 | 1901 | 1928 | 1943 | 27 |
| Std Dev (± sigma): | | 1 | 4 | 6 | 5 | 8 | 3 | 24 | 8 | 19 | 18 |
| w/CO$_2$ | 77004 | 2604 | 2250 | 2250 | 2240 | 0 | 2545 | 2185 | 2185 | 2130 | 0 |
| w/CO$_2$ | 77008 | 2603 | 2275 | 2275 | 2250 | 0 | 2544 | 2200 | 2200 | 2150 | 0 |
| w/CO$_2$ | 77010 | 2603 | 2260 | 2260 | 2255 | 0 | 2545 | 2205 | 2205 | 2150 | 0 |
| w/CO$_2$ | 77012 | 2604 | 2255 | 2255 | 2250 | 0 | 2547 | 2200 | 2200 | 2150 | 0 |
| Average: | | 2604 | 2260 | 2260 | 2249 | 0 | 2545 | 2198 | 2198 | 2148 | 0 |
| Std Dev (± sigma): | | 1 | 11 | 11 | 6 | 0 | 1 | 9 | 9 | 13 | 0 |

Thus, the reduction and/or elimination of voltage delay in a mixed metal oxide electrochemical system, that has been depleted of approximately 40% to 70% of its capacity, and preferably contains an electrolyte comprised of solvents from a family of cyclic carbonates and diethers having CO$_2$ saturated therein, is an unexpected and desirable result of the present invention.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:

a) an anode comprising an alkali metal which is electrochemically oxidizable to form metal ions in the cell upon discharge to generate electron flow in an external electrical circuit connected thereto;

b) a cathode comprising a cathode active material wherein the electron flow is generated by intercalation of the metal ions formed by oxidation of the alkali metal anode into the cathode active material; and c) a nonaqueous electrolyte operatively associated with the anode and the cathode, wherein the electrolyte comprises a mixture of a low viscosity solvent selected from either an ether or a dialkyl carbonate, and mixtures thereof, and a high permittivity solvent selected from either a cyclic carbonate or a cyclic amide, and mixtures thereof and wherein an alkali metal salt is dissolved in the solvent mixture, the alkali metal salt having the general formula MM'F$_6$ wherein M is an alkali metal similar to the alkali metal comprising the anode and M' is an element selected from the group consisting of phosphorous, arsenic and antimony, the improvement comprising:

a carbon oxide dissolved in the electrolyte sufficient to eliminate voltage delay at such time as the cell is discharged under current pulse conditions.

2. The electrochemical cell of claim 1 wherein the carbon oxide is carbon dioxide.

3. The electrochemical cell of claim 1 wherein the electrolyte is saturated with carbon dioxide.

4. The electrochemical cell of claim 1 wherein the electrolyte contains about 0.2% carbon dioxide, by weight.

5. The electrochemical cell of claim 1 wherein the anode comprises lithium as the alkali metal and wherein the alkali metal salt comprising the electrolyte is selected from the group consisting of $LiPF_6$, $LiAsF_6$, $LiSbF_6$, $LiBF_4$, $LiClO_4$, $LiC(SO_2CF_3)_3$, $LiN(SO_2CF_3)_2$ and $LiCF_3SO_3$, and mixtures thereof.

6. The electrochemical cell of claim 1 wherein the low viscosity solvent is selected from the group consisting of 1,2-dimethoxyethane, dimethyl carbonate, tetrahydrofuran, diglyme, triglyme and tetraglyme, and mixtures thereof.

7. The electrochemical cell of claim 1 wherein the high permittivity solvent is selected from the group consisting of propylene carbonate, ethylene carbonate, dimethyl sulfoxide, acetonitrile, dimethyl formamide and dimethyl acetamide, and mixtures thereof.

8. The electrochemical cell of claim 1 wherein the nonaqueous electrolyte comprises propylene carbonate and dimethoxyethane.

9. The electrochemical cell of claim 11 wherein the anode is comprised of lithium.

10. The electrochemical cell of claim 1 wherein the propylene carbonate and dimethoxyethane are present in a ratio of about 1:1 by volume.

11. The electrochemical cell of claim 1 wherein the anode comprises either lithium or a lithium-aluminum alloy.

12. The electrochemical cell of claim 11 wherein the aluminum comprises up to about 50%, by weight, of the anode alloy.

13. The electrochemical cell of claim 1 wherein the anode comprises lithium and the alkali metal salt comprising the electrolyte is lithium hexafluoroarsenate.

14. The electrochemical cell of claim 1 wherein the cathode active material comprising the cathode is selected from the group consisting of silver vanadium oxide, copper silver vanadium oxide, manganese dioxide, cobalt oxide, nickel oxide, carbon, fluorinated carbon, titanium disulfide and copper vanadium oxide, and mixtures thereof.

15. The electrochemical cell of claim 1 wherein the cathode comprises from between about 80 weight percent to about 99 weight percent of the cathode active material.

16. The electrochemical cell of claim 1 wherein the cathode further comprises at least one of a binder material and conductor additives.

17. The electrochemical cell of claim 16 wherein the binder material is a fluoro-resin powder.

18. The electrochemical cell of claim 16 wherein the conductive additives are selected from the group consisting of carbon, graphite powder, acetylene black and a combination thereof.

19. The electrochemical cell of claim 1 wherein the cathode comprises about 0 to 3 weight percent carbon, about 1 to 5 weight percent of a powder fluoro-resin and about 94 weight percent of the cathode active material.

20. A method for reducing voltage delay in an electrochemical cell activated with a nonaqueous electrolyte, which comprises:

a) providing an anode comprising an alkali metal;

b) providing a solid cathode comprising cathode active material;

c) activating the electrochemical cell with the nonaqueous electrolyte operatively associated with the anode and the cathode, wherein the electrolyte comprises a mixture of a low viscosity solvent selected from either an ether or a dialkyl carbonate, and mixtures thereof, and a high permittivity solvent selected from either a cyclic carbonate or a cyclic amide, and mixtures thereof, and wherein an alkali metal salt is dissolved in the solvent mixture, the alkali metal salt having the general formula $MM'F_6$ wherein M is an alkali metal similar to the alkali metal comprising the anode and M' is an element selected from the group consisting of phosphorous, arsenic and antimony; and d) dissolving an amount of a carbon oxide in the electrolyte sufficient to eliminate voltage delay during discharging the cell under current pulse conditions.

21. The method of claim 20 including saturating the electrolyte with the carbon oxide.

22. The method of claim 20 including providing the carbon oxide as carbon dioxide.

23. The method of claim 22 including dissolving about 0.2%, by weight, carbon dioxide in the electrolyte.

24. The method of claim 20 including selecting the alkali metal salt comprising the electrolyte from the group consisting of $LiPF_6$, $LiAsF_6$, $LiSbF_6$, $LiBF_4$, $LiClO_4$ $LiC(SO_2CF_3)_3$, $LiN(SO_2CF_3)_2$ and $LiCF_3SO_3$, and mixtures thereof.

25. The method of claim 20 including selecting the low viscosity solvent from the group consisting of 1,2-dimethoxyethane, dimethyl carbonate, tetrahydrofuran, diglyme, triglyme and tetraglyme, and mixtures thereof.

26. The method of claim 20 including selecting the high permittivity solvent from the group consisting of propylene carbonate, ethylene carbonate, dimethyl sulfoxide, acetonitrile, dimethyl formamide and dimethyl acetamide, and mixtures thereof.

27. The method of claim 20 including providing the nonaqueous electrolyte comprising propylene carbonate and dimethoxyethane.

28. The method claim 27 including providing the propylene carbonate and dimethoxyethane in a ratio of about 1:1 by volume.

29. The method of claim 27 including providing the anode as lithium.

30. The method of claim 20 including providing the anode comprising either lithium or a lithium-aluminum alloy.

31. The method of claim 30 including providing the aluminum comprising up to about 50%, by weight, of the anode alloy.

32. The method of claim 20 including providing the anode comprising lithium and the alkali metal salt comprising the electrolyte as lithium hexafluoroarsenate.

33. The method of claim 20 including selecting the cathode active material from the group consisting of silver vanadium oxide, copper silver vanadium oxide, manganese dioxide, cobalt oxide, nickel oxide, carbon, fluorinated carbon, titanium disulfide and copper vanadium oxide, and mixtures thereof.

34. The method of claim 20 including providing the cathode comprising from between about 80 weight percent to about 99 weight percent of the cathode active material.

35. The method of claim 20 including providing the cathode comprising at least one of a binder material and conductive additives.

36. The method of claim 20 including providing the cathode comprising about 0 to 3 weight percent carbon, about 1 to 5 weight percent of a powder fluoro-resin and about 94 weight percent of the cathode active material.

* * * * *